United States Patent Office 3,013,569
Patented Dec. 19, 1961

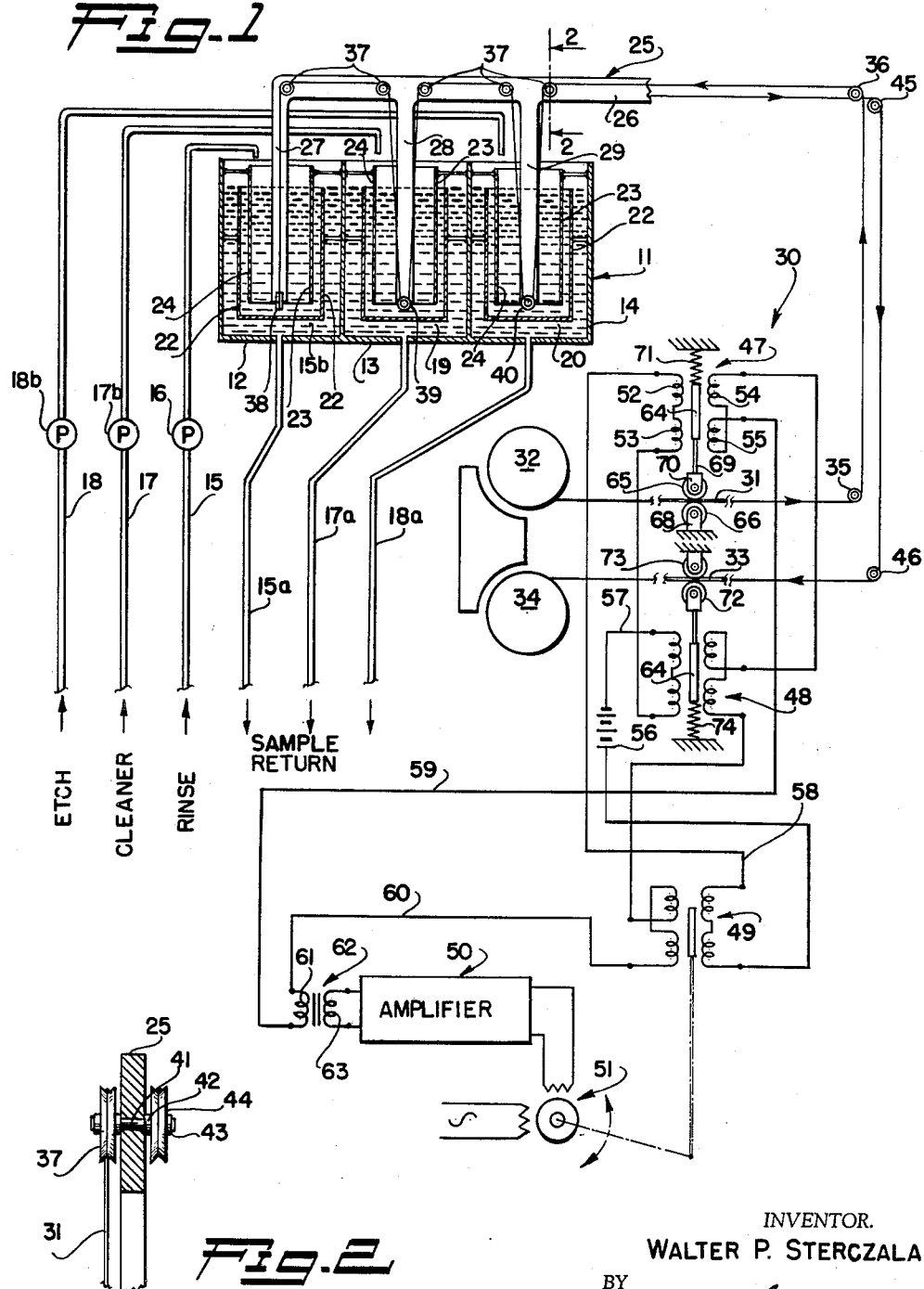

3,013,569
CHEMICAL MILLING ETCH-RATE CONTROL APPARATUS
Walter P. Sterczala, Burbank, Calif., assignor to Lockheed Aircraft Corporation, Burbank, Calif.
Filed May 20, 1959, Ser. No. 814,440
5 Claims. (Cl. 134—113)

The present invention relates to apparatus and a method for making comparative measurements of a variable item relative to a standard, and more specifically, to an apparatus and method for measuring and controlling the etch-rate of a chemical etchant working on a work piece in a chemical milling process.

In recent years, a great amount of interest has been developed in chemical milling processes wherein metal work pieces are shaped by subjecting them to the corrosive action of a chemical etchant for a predetermined time or for the time necessary for the etchant to have etched the work piece to the desired shape and form. The aircraft industry in particular has been most interested in chemical milling because of the metal removing problems inherent and unique to this industry. While chemical milling has been proven to the extent that it has a place in modern technology for the removal of metal, the inherent difficulty today is that no suitable method is available for accurately and continuously measuring and controlling the etch-rate so that the work piece can be removed from the etchant at the proper time, due consideration being given to the fact that the effectiveness as a metal removing agent of the chemical etchant declines as the milling operation proceeds. This necessarily results in undue personal control during the processing and a relatively high percentage of spoils.

It is a principle of the present invention to provide apparatus and a process peculiarly applicable to chemical milling whereby an accurate and continuous measurement of the etch-rate on the work piece during the processing can be maintained by measuring the change in the size of a control which is drawn through the chemical etchant and recording this change in comparison with a standard which is unchanged.

It is therefore a primary object of the present invention to generally improve the process of chemical milling and chemical milling apparatus.

A further object of the present invention is to provide means whereby the etch-rate of a chemical etchant working on a work piece in a chemical milling process can be measured.

A still further object of the present invention is to provide a system for measuring the etch-rate of a chemical etchant working on a work piece by recording the change in size of a control wire drawn through the etchant to a standard wire which is not drawn through the etchant.

Yet another object of the present invention is to provide a system for measuring the etch-rate in a chemical milling operation employing the application of electrical sensing means for sensing the thickness of the wire which has been drawn through the chemical etchant to the thickness of a like wire which has not been drawn through the chemical etchant and recording any variation in thickness detected by the sensing device by means of suitable recording apparatus.

Other advantages and objects of the present invention will be readily apparent to those skilled in the art upon perusal of the following description and drawings wherein:

FIG. 1 is a combination cross-sectional elevational view and a diagrammatic view of the chemical milling apparatus of the present invention.

FIG. 2 is a vertical cross-sectional view taken on the line 2—2 of FIG. 1, with parts removed and slightly enlarged.

The preferred embodiment of the present invention is disclosed as entailing a sample vat which is positioned in association with the main milling vat. The sample vat is compartmented in a manner similar to the main vat and the respective milling solutions of the main vat are circulated continuously through the respective compartments of the sample vat and maintained at a predetermined level therein. A control wire is trained to move at a predetermined rate through the milling solutions of the sample vat and measuring means are provided for continuously measuring the change in the sample wire after exposure relative to a standard unexposed wire.

Referring now to the drawings, a compartmented sample vat 11 is provided which consists of a plurality of compartments, three in this instance, 12, 13 and 14. The compartments are so constructed as to be fluid tight and compartment 12 is interconnected with the corresponding compartment of the main milling vat, not shown and the details of which form no part of the present invention, by a feed conduit 15 and a return conduit 15a. A rinse solution is continuously circulated through the compartment 12 from the corresponding compartment of the main vat by a pump 16 interconnected in conduit 15. The compartments 13 and 14 are also interconnected with their corresponding compartments of the main vat by feed conduits 17 and 18 and respective return conduits 17a and 18a and suitable pumps 17b and 18b are provided for continuously circulating a cleaner solution 19 and a chemical etchant 20 between the main vat and the respective compartments. Each of the compartments has an inner compartment 22 fixed therein and each of the inner compartments has suitable baffles 23 and 24 for preventing waving or splashing of the respective solutions for well known reasons. The size of the feed conduits, the return conduits and the capacity of the pumps are so calculated that the solutions in the respective compartments are maintained at a predetermined level.

A wire support 25, which in the present instance is disclosed as being a comb-shaped member with a body portion 26 and depending teeth 27, 28 and 29 is provided with tooth 27 being immersed in the rinse solution, the tooth 28 being immersed in the cleaner solution, and the tooth 29 being immersed in the etching solution. The support 25 is preferably formed of material not affected by the various solutions contained in the vat 11 as will be more fully appreciated hereinafter. It will be understood that suitable means will be provided for lifting the support 25 out of the vat 11 and for holding the support piece in the solution in the predetermined position. Such means can be of any suitable type or design and are not disclosed herein since they form no part of the present invention.

As previously suggested, the rate and/or time of immersion of any work piece in an etching solution and the etch-rate of the solution are the critical considerations in chemical milling.

For measuring the etch-rate of the work piece during the milling operation a measuring device, designated broadly by the number 30, is provided. The determination of the etch-rate is made by measuring the thickness of a control wire 31 which is drawn off a suitable spool 32 and the thickness of a return flight of this wire 33 which is being wound by a spool 34. The spool 34 could preferably be power driven in any suitable manner and at a predetermined and controllable speed and the spool 32 could preferably be freely rotatable but subjected to sufficient frictional drag so that the wire is maintained in a substantially taut condition in its course of travel.

The wire 31 is drawn from the spool 32 and trained over a pair of pulleys 35 and 36 to the support 25. The support 25 carries a series of pulleys 37 on the front face of the body portion 26 and pulleys 38, 39 and 40 are carried adjacent the end of each of the respective teeth 27, 28 and 29. Each of these pulleys is preferably rotatably supported on a cross-shaft 41 and held on the shaft between a spacer 42 and a lock nut 43, see FIG. 2. The back face of the body portion also carries a series of pulleys 44 rotatably supported on the same shafts as pulleys 37 for directing the return flight of the wire toward the spool 34. The pulley 38 carried by the tooth 27 of the work piece rotates about an axis substantially normal to the axis of rotation of the pulleys 39 and 40 so that the wire 27 is directed upwardly and initiates its return flight toward the spool 34, and pulleys 45 and 46 are provided for training the wire toward the spool 34.

The etch-rate of the chemical etchant upon the work piece is determined by measuring the etchant reaction upon that portion of the wire immersed in the sample etchant solution for a predetermined length of time. In other words, after the control wire has been exposed to the sample chemical etchant for a predetermined time, its thickness is measured against the wire 31, unexposed, as a standard and from the comparison of these two measurements, the etch-rate of the chemical etchant can be computed. It will be appreciated that since the milling solutions in the main vat are continuously circulated through the sample vat, that the etch-rate of the control wire will be identical to the etch-rate of the work piece.

For measuring the thickness of the respective wires for determining the etch-rate of the sample etchant, a balanced system of differential transformers interconnected in a bridge circuit is employed. More specifically, a pair of differential transformers 47 and 48, each of which acts as a sensing device, the transformer 47 sensing the thickness of the wire 31, unexposed, and the transformer 48 sensing the thickness of the return flight 33, exposed, are interconnected in a bridge circuit with a third differential transformer 49. Interconnected in the circuit is an amplifier 50 which in turn is connected with a suitable servo motor 51 which can be in the form of a chart recorder and/or visual indicator. Since the differential transformers are interconnected in a balanced circuit, and assuming that the wire 31, unexposed, is constant in thickness, any variation in the thickness of the wire of the return flight 33, exposed, whether plus or minus, will be reflected by the differential transformer 49 to the extent sufficient to keep the system in balance, which reflection will be amplified and recorded by the servo motor.

More specifically, each of the differential transformers consists of a pair of primary coils 52 and 53 connected in series and a pair of secondary coils 54 and 55 connected in reversed series. The primary coils of each of the differential transformers are connected in series with a suitable source of alternating current indicated by the number 56 by a pair of leads 57 and 58. The secondary coils of each of the differential transformers are connected in series by leads 59 and 60 with a primary coil 61 of a transformer 62, a secondary coil 63 of such transformer being interconnected with the amplifier 50 which in turn is connected with the servo motor 51.

Each of the differential transformers has a lineally shiftable armature 64, and displacement of the armature from the electrical center position of the transformer will result in an increased induced voltage in one of the secondary coils and a corresponding decreased induced voltage in the other. As a result, a differential voltage appears across the secondary terminals and the relationship between the armature displacement and the measurement of the differential voltage is used for measuring and recording purposes.

More specifically, the initial flight of wire 31 is directed through a pair of sensing rollers 65 and 66, rollers 66 being fixed against displacement by being fixed to a suitable support 67 by a standard 68 and roller 65 being shiftable in response to the thickness of the wire passing between the rollers and bearing against the armature 64 of transformer 47 by means of a rigid member 69 fixed to a standard 70, the armature in turn being urged in one direction by means of a compression spring 71 so as to maintain the sensing roller 65 in frictional contact with the wire. A similar arrangement of sensing rollers 72 and 73 is provided for the wire of return flight 33 and the armature 64 of transformer 48 is likewise resiliently urged in one direction by the force of a compression spring 74 so as to urge the roller 72 into frictional contact with the wire.

Since each of the transformers 47 and 48 is a measuring device of the phase shift of its respective armature 64, or plus or minus voltage output, the resulting output of the transformer 49 is the algebraic sum of the voltage output of each of the transformers 47 and 48. Therefore, assuming that the wire 31, unexposed, is of constant thickness, any variation in the algebraic sum of the voltage output of transformers 47 and 48 is logically indicative of the change in wire size of the wire of return flight 33 and this is directly reflected by a shift of the armature of transformer 49 to an extent sufficient to balance the circuit. This shift is amplified and recorded by the servo motor.

The sensitivity of differential transformers of the type contemplated in use here can be in the order of 0.2 millivolt so that an etch-rate in the order of 0.001 inch per minute can be calculated.

In operation, it will be appreciated that the wire is initially trained between the sensing rollers 65 and 66, then around the pulleys 35 and 36, then around the first pulley 37, then downwardly around pulley 40, then upwardly around the second and third pulleys 37, then downwardly around pulley 39, then upwardly again around fourth and fifth pulleys 37, and then downwardly around pulley 38. The pulley 38 trains the wire upwardly on its return flight around the pulleys 44, 45 and 46 between the sensing rollers 72 and 73 to the winding spool. It will be appreciated, of course, that the wire is preferably formed of the same metal as the work piece. After the work piece and the control wire are concurrently immersed in the various solutions, and after a predetermined length of time, the control wire is wound upon the power driven spool until that portion which was immersed in the etchant solution is drawn between the sensing rollers 72 and 73. Any decrease in thickness of this wire will cause a shift in the position of the armature of transformer 48, and assuming that the initial flight of the wire, unexposed, passing through the sensing rollers 65 and 66 is constant, this shift of the armature of transformer 48 will be balanced by a shift in the armature of the transformer 49 in a direction and to the extent necessary to once again balance the circuit. This, as previously mentioned, will be amplified and recorded by the servo motor so that the etch-rate for the time period the wire was exposed to the etchant solution can be easily calculated. It will be appreciated that the wire can be exposed to the etchant solution for any pre-determined time interval and according to any pre-determined sequence of operation and calculations made as to the etch-rate. It will also be appreciated that the wire can be continuously moved through the etchant solution and subsequently through the cleaner solution and the rinse solution at a pre-determined rate of speed, and the sensing device can then measure on a continuing and dynamic basis the rate of change in the wire as it is passed through the sensing rollers.

It will also be appreciated that motorized valves can be incorporated for feeding the various solutions into the main vat when the recorded etch-rate indicates that the chemical etchant is losing its effectiveness. In this manner, a predetermined concentration of the chemical etchant can automatically be maintained during the milling operation.

While the invention has been illustrated and described principally in connection with drawing a control wire through the etchant solution at a predetermined rate of speed or in a pre-determined sequence of operation and then measuring the decrease in the size of the standard wire and the wire after the same has been exposed to the etchant solution for a predetermined length of time by means of differential transformer sensing devices, it will be appreciated that other suitable measuring devices can be employed and that other metallic control means besides wire as such can be used. For the purposes of this application, the term "wire" is used to denote any metallic object, whether flexible or rigid, e.g., wire, foil, rigid rod or sheet material, etc., which can be trained to move into and out of the chemical etchant at a pre-determined sequence of operation and which can be measured relative to a standard.

What is claimed is:

1. Apparatus for measuring the etch-rate of a chemical etchant upon a work piece comprising a control wire, a standard wire, a sensing roll for said control wire, a sensing roll for said standard wire, means for training said control wire after the same has been exposed to the chemical etchant for a predetermined length of time to its sensing roll, means for training said standard wire to its sensing roll, means responsive to the positions of said sensing rolls for measuring the decrease in thickness of said control wire relative to said standard wire, and means for recording said change for calculating the etch-rate of said chemical etchant upon said work piece.

2. Apparatus for measuring the etch-rate of a chemical etchant upon a work piece comprising a control wire, a standard wire, a pair of sensing transformers coupled in a bridge circuit with a third transformer to a source of electrical energy, means for training said control wire after it has been exposed to said chemical etchant for a predetermined length of time to one of said sensing transformers, means for training the standard wire to the other of said sensing transformers, means for effecting a shift of the armature of each of said sensing transformers in response to an increase or decrease in the thickness of the respective wire, the shift in the armature of any one of said sensing transformers being compensated by a shift of the armature of the third transformer to the extent necessary to balance the circuit, and means for recording any shift of the armature of said third transformer so that the etch-rate can be calculated.

3. The apparatus defined in claim 2 further characterized by the output circuit of said transformers being interconnected with amplifier means and said amplifier means having an output circuit coupled with a servo motor.

4. The apparatus defined in claim 3 further characterized by the second mentioned means comprising a pair of sensing rollers, one of said rollers being fixed against displacement and the other of said rollers being shiftable in response to the thickness of wire passing between said rollers, said shiftable roller causing its associated armature to shift a like distance in the same direction.

5. The apparatus defined in claim 4 further characterized by said control wire and said standard wire being a continuous piece.

References Cited in the file of this patent

UNITED STATES PATENTS

| 2,068,352 | Schlacks | Jan. 19, 1937 |
| 2,443,661 | Lenehan | June 22, 1948 |
| 2,762,035 | Triman | Sept. 4, 1956 |
| 2,827,725 | Edds | Mar. 25, 1958 |

OTHER REFERENCES

Corrosometer, Bulletin C1–57, pub. by Crest Instrument Co., Santa Fe Springs, Calif.